(12) United States Patent
Akahoshi

(10) Patent No.: US 8,472,298 B2
(45) Date of Patent: Jun. 25, 2013

(54) OPTICAL INFORMATION RECORDING AND REPRODUCING APPARATUS AND OPTICAL INFORMATION RECORDING METHOD

(75) Inventor: Kenji Akahoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 12/457,149

(22) Filed: Jun. 2, 2009

(65) Prior Publication Data

US 2009/0296558 A1 Dec. 3, 2009

(30) Foreign Application Priority Data

Jun. 2, 2008 (JP) ................................. 2008-144045

(51) Int. Cl.
*G11B 7/00* (2006.01)
*G11B 20/10* (2006.01)

(52) U.S. Cl.
USPC ............... 369/103; 369/112.24; 369/13.03; 369/13.24; 369/13.35; 369/112.01

(58) Field of Classification Search
USPC ............ 369/103, 112.1, 13.03–13.05, 13.16, 369/13.24, 13.28, 13.35, 112.01, 112.24
See application file for complete search history.

(56) References Cited

U.S. PATENT DOCUMENTS

| | | | | |
|---|---|---|---|---|
| 3,773,400 | A * | 11/1973 | Amodei et al. | 359/7 |
| 6,468,699 | B2 * | 10/2002 | Lahrichi | 430/1 |
| 6,686,097 | B2 * | 2/2004 | Lahrichi | 430/1 |
| 7,551,538 | B2 * | 6/2009 | Hori et al. | 369/103 |
| 7,596,463 | B2 * | 9/2009 | Malki et al. | 702/85 |
| 7,626,913 | B2 * | 12/2009 | Usami | 369/103 |
| 8,000,205 | B2 * | 8/2011 | Hori et al. | 369/103 |
| 8,000,206 | B2 * | 8/2011 | Hossfeld et al. | 369/103 |
| 2006/0275670 | A1 * | 12/2006 | Riley et al. | 430/1 |
| 2007/0091768 | A1 | 4/2007 | Hori et al. | |
| 2007/0195390 | A1 * | 8/2007 | Tsukagoshi et al. | 359/15 |
| 2007/0206250 | A1 * | 9/2007 | Takano et al. | 359/3 |
| 2008/0037397 | A1 * | 2/2008 | Waldman et al. | 369/103 |
| 2009/0073850 | A1 * | 3/2009 | Ide et al. | 369/103 |

FOREIGN PATENT DOCUMENTS

| | | |
|---|---|---|
| JP | 11-133843 | 5/1999 |
| JP | 2003-178461 | 6/2003 |
| JP | 2004-272268 | 3/2004 |
| JP | 2007-519036 | 12/2004 |
| JP | 2007-101881 | 10/2005 |
| JP | 2007-256945 | 2/2007 |
| JP | 2007-122005 | 5/2007 |
| WO | WO 2004/102542 A1 | 5/2004 |
| WO | WO 2005/059902 A2 | 12/2004 |
| WO | WO2007/107439 * | 9/2007 |

* cited by examiner

*Primary Examiner* — Wayne Young
*Assistant Examiner* — Dionne Pendleton
(74) *Attorney, Agent, or Firm* — Stites & Harbison PLLC; Juan Carlos A. Marquez, Esq.; Nicholas B. Trenkle, Esq.

(57) ABSTRACT

An optical information recording and reproducing apparatus includes an irradiation unit of a signal light beam and a reference light beam required for data recording, and a cure irradiation unit having at least one of a pre-cure irradiation that irradiates a predetermined light beam on to a desired position prior to irradiating the reference light bean and the signal light beam on to the desired position when information is recorded in the desired position on an optical information recording medium and a post-cure irradiation that irradiates a predetermined light beam on to the desired position so as to make the desired position non-recordable after the information is recorded in the desired position on the recording medium. The cure irradiation unit is disposed in one driving device in a freely movable manner in the driving device.

2 Claims, 10 Drawing Sheets

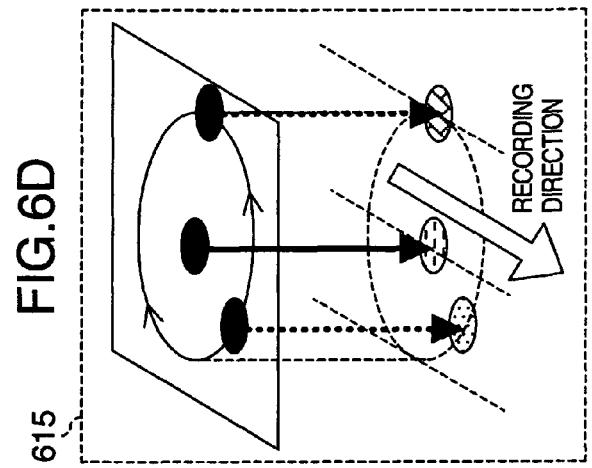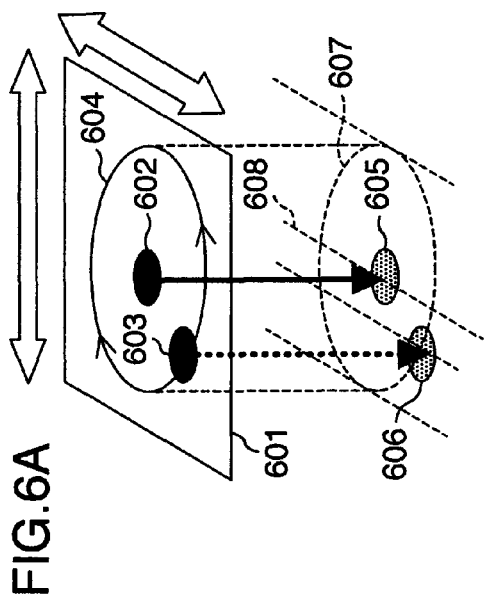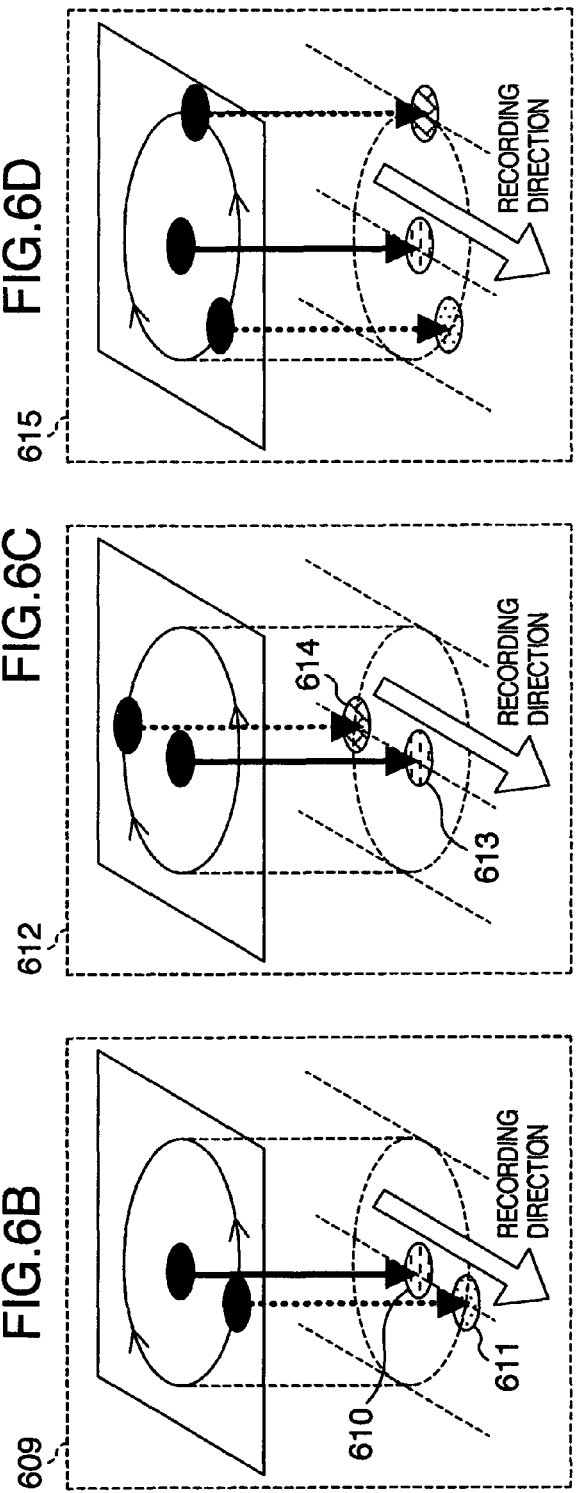

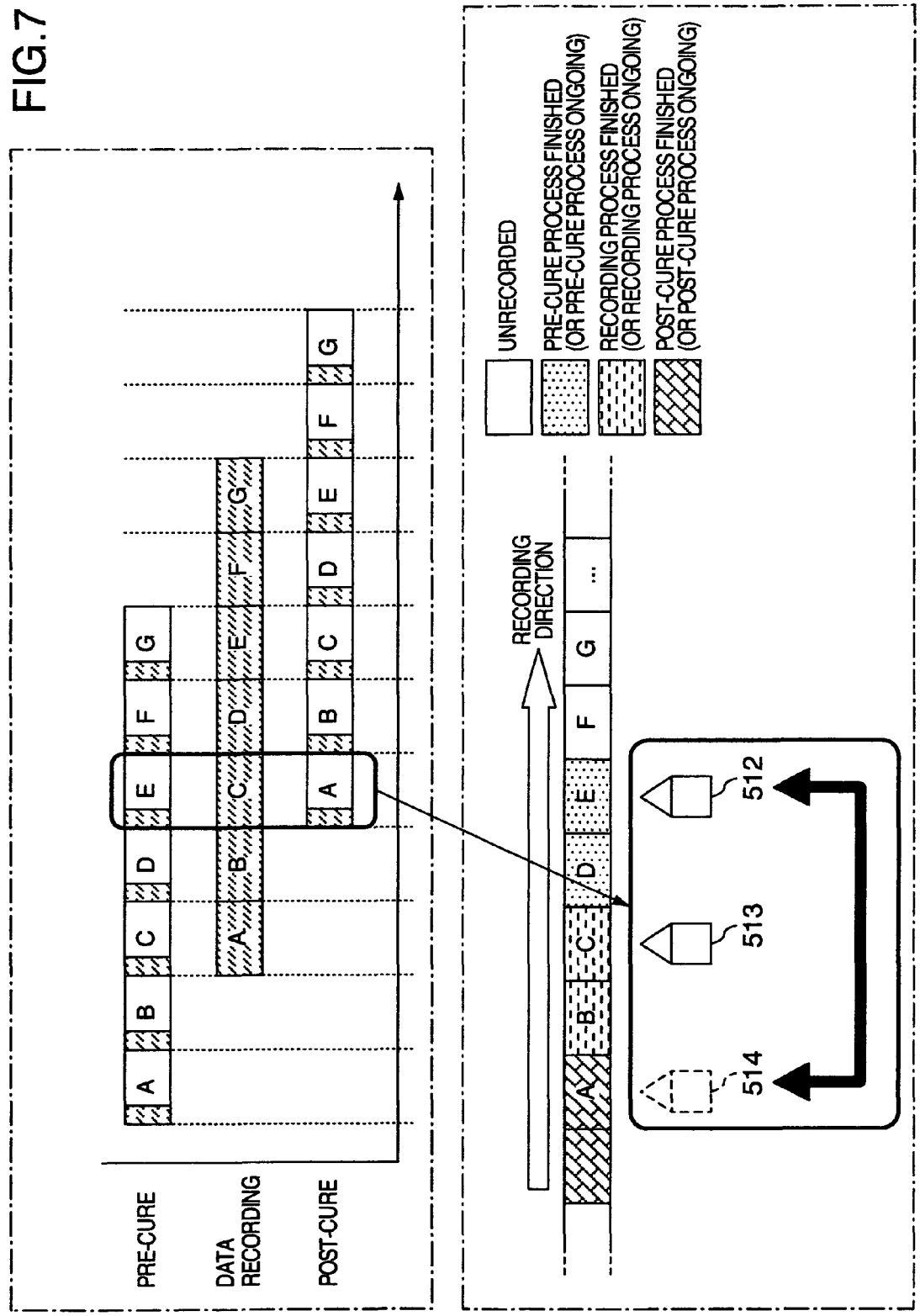

OPTICAL INFORMATION RECORDING AND REPRODUCING APPARATUS AND OPTICAL INFORMATION RECORDING METHOD

INCORPORATION BY REFERENCE

The present application claims priority from Japanese application JP2008-144045 filed on Jun. 2, 2008, the content of which is hereby incorporated by reference into this application.

BACKGROUND OF THE INVENTION

The present invention relates to an optical information recording and reproducing apparatus to record/reproduce information in/from an optical information recording medium by using a holography.

In these days, with a Blu-ray Disc (BD) standard and a High Definition Digital Versatile Disc (HD DVD) standard, optical discs having as large as 50 GB recording density can be produced on a commercial basis in a consumer use by using a blue-violet semiconductor laser.

In the future, it is desired that the optical disc has a large recording capacity such as HDD (Hard Disc Drive) having as large as 100 GB to 1 TB.

However, for a purpose of realizing the above-mentioned ultra-high density optical disc, a new storage technique is required such that it is different from an old trend using an existing high density technique that depends on making a wavelength shorter and the NA of an object lens higher.

On researching into a next-generation storage technique, a hologram recording technique has been taken notice of recording digital information by using the holography.

The hologram recording technique is that a signal light beam having information of page data modulated two-dimensionally by a spatial light modulator is superposed with a reference light beam inside a recording medium, and an interference fringe pattern occurs at this time to thereby arise a refraction index modulation inside the recording medium and then record information.

On reproducing information, the reference light beam used for the record is irradiated on the recording medium with the same reference light beam arranged. Consequently, a hologram recorded in the recording medium acts as a diffraction grating to generate a diffracted light. This diffracted light is reproduced as an identical light containing the recorded signal light beam and phase information.

A reproduced signal light beam is detected two-dimensionally at a high speed by using an optical detector such as CMOS, CCD, etc. The above-mentioned hologram recording is effective for recording and reproducing a large amount of information in a high speed, since two-dimensional information is recorded and reproduced simultaneously by using a single hologram and a plural number of page data can be overwritten on the same position.

JP-A-2004-272268 has proposed a hologram recording technique. This document discloses a so-called angle multiplexing recording system in which a signal light beam is converged onto an optical information recording medium by a lens, at the same time, the reference light beam of a parallel light beam is irradiated thereon so as to be made interfered with the signal light beam to record a hologram, and further, in order to execute a multiple recording, different page data is displayed on the spatial light modulator, while an incident angle of the reference light beam toward the optical recording medium is varied. JP-A-2004-272268 also discloses a technique in which the signal light beam is converged on the optical information recording medium by a lens to arrange an opening or aperture (spatial filter) on its light waist position, so that an interval adjacent to the hologram can be made short, and the recording density or capacity can be made increased, compared with the existing angle-multiplex-recording system.

WO2004-102542 has also proposed a hologram recording technique. This document discloses a technique using a shift multiplex system in which a light coming from an inner side of pixels is set to the signal light beam flux in a single spatial light modulator and a light coming from an outer side of orbicular zone pixels is set to the reference light beam therein. Both of the light beams are converged onto an optical recording medium by using the same lens so as to make the signal and reference light beams interfered at a vicinity of a lens focal plane to thereby record a hologram.

Further, JP-A-2007-101881 has disclosed that a fixing process is required for prior to a recording when optical information is recorded in an optical recording medium. In this case, the fixing process prior to the recording is referred to as a pre-cure process.

Further, JP-A-2007-256945 has disclosed that a fixing process is required after the recording when the optical information is recorded in the optical information recording medium. It says that a chemical reaction caused by a recording light beam occurs in the optical information recording medium and in the case of the chemical reaction caused by a reproduced illumination beam etc., too, a reproduction condition is unstable since the recorded information condition is changed a little bit at a time and recorded data may disappear, which is not desirable. Therefore, JP-A-2007-256945 says that fixing process is required so that the chemical reaction may not occur which otherwise occur due to the reproduced illumination beam etc., after the recording. JP-A-2007-256945 and JP-A-2007-519036 have also disclosed a technique for executing fixing process and recording process at the same time after recording to thereby shorten a time period involved by eliminating the need for separately allocating the time for the fixing process.

SUMMARY OF THE INVENTION

An optical information recording and reproducing apparatus using the holography requires an irradiation process (hereinafter, referred to as a pre-cure process) prior to the recording, as mentioned in JP-A-2007-101881, and the fixing process (hereinafter, referred to as a post-cure process) after the recording, as mentioned in JP-A-2007-256945.

The pre-cure and post-cure processes are required as a pre-process and post-process for the recording, not as an irradiation process for real data recording. Therefore, these processes cause a wasted process time period from a viewpoint of a data transfer rate, so that these processes cause the data transfer rate to become lowered.

Consequently, the post-cure process is executed during data recording process to prevent lowering of the data transfer rate, as mentioned in JP-A-2007-256945. However, in the case of a system that requires the pre-cure process and/or the post-cure process, JP-A-2007-256945 provides a driving device (the "actuator" as referred to in the JP-A-2007-256945) for each of the processing units of the data recording process and the fixing process so as to be able to move to arbitrary positions. However, in the case of a recording and reproducing apparatus for recording information in an existing optical disc which is typified as CD and DVD, a single driving device is required for moving an irradiation unit (or pickup) up to a target irradiation position since the pre-cure process and the post-cure process are not required and hence, unlike JP-A-2007-256945, a plurality of driving devices are not required. Therefore, the provision of a plurality of driving devices as in JP-A-2007-256945 causes a cost increase.

The present invention is made in light of the above-mentioned problems and it is an object of the invention to provide an optical information recording and reproducing apparatus which, in executing an optical information recording and reproducing process using a holography which requires a pre-cure process prior to a data recording or a post-cure process after data recording, is capable of executing the data recording and the pre-cure process prior to the data recording, or the post-cure process after the data recording, without providing a plurality of driving devices, when the cure process is simultaneously executed during the data recording.

The object of the invention can be achieved by the invention defined in the scope of claims.

With the invention, in recording digital information using the holography requiring the pre-cure process or the post-cure process, an optical information recording and reproducing apparatus is provided in low cost, even though the pre-cure process and/or post-cure process is executed at the same time as recording the data.

The other objects, features and advantages of the invention will become apparent from the following description of the embodiments of the invention taken in conjunction with the accompanying drawings.

BRIEF DESCRIPTION OF THE DRAWINGS

FIG. 6A is an explanatory diagram of a first embodiment that realizes a low cost as an example 1;

FIG. 6B is another explanatory diagram of the first embodiment that realizes a low cost as an example 1;

FIG. 6C is still another explanatory diagram of the first embodiment that realizes a low cost as an example 1;

FIG. 6D is still another explanatory diagram of the first embodiment that realizes a low cost as an example 1;

FIG. 7 is an explanatory diagram of the first embodiment that realizes a low cost as an example 2;

DETAILED DESCRIPTION OF THE EMBODIMENTS

Hereinafter, embodiments of the invention will be described with reference to the drawings.

[Embodiment 1]

Figure 1:
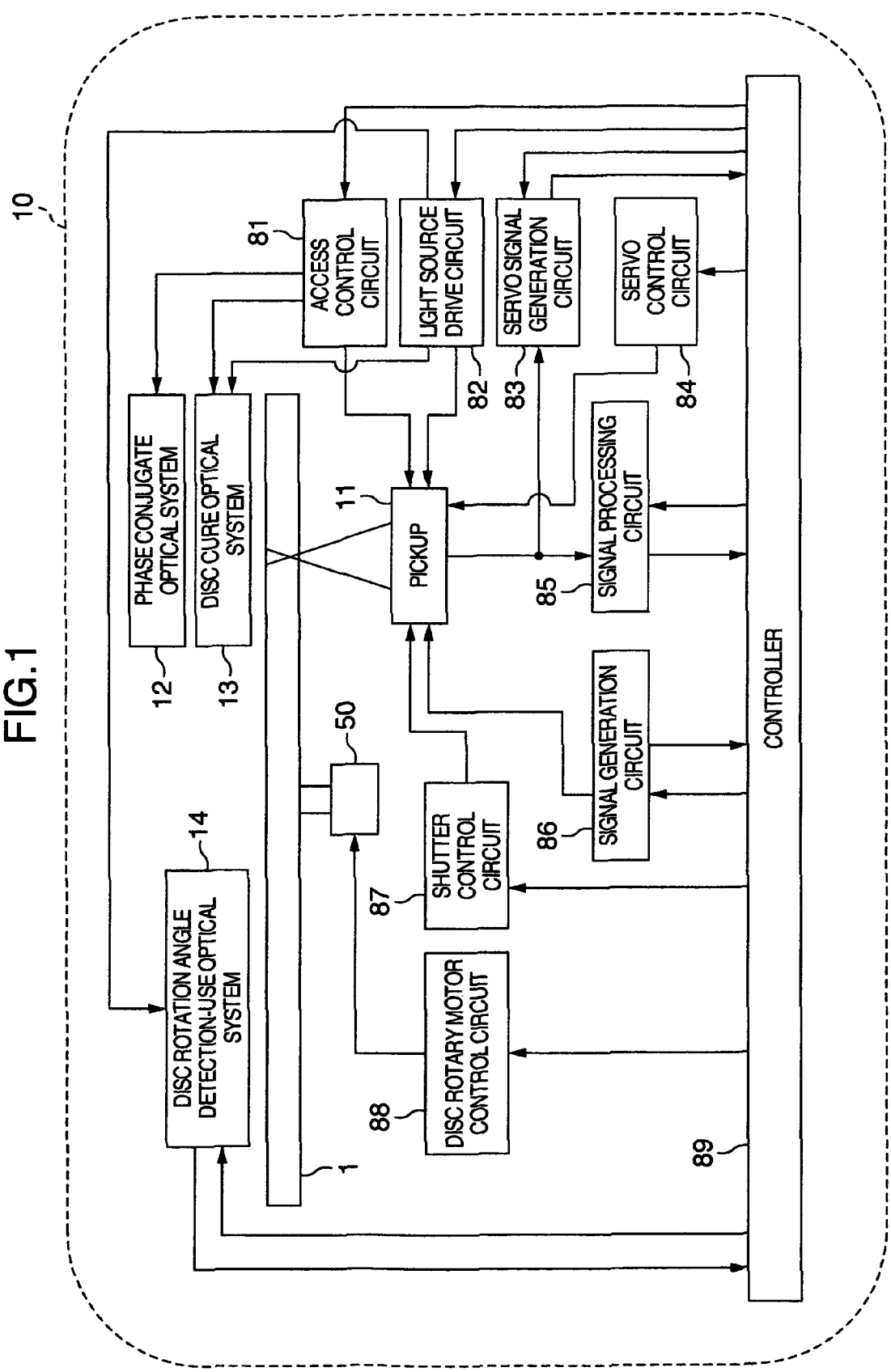
FIG. 1 is a schematic diagram showing an optical information recording and reproducing apparatus in an embodiment of the invention.

FIG. 1 is a overall constitutional diagram showing an optical information recording and reproducing apparatus for recording and/or reproducing digital information by using a holography.

An optical information recording and reproducing apparatus 10 includes an optical pickup 11, a phase conjugate optical system 12, a disc cure optical system 13, a disc rotation angle detection-use optical system 14, and a rotary motor (DC motor or stepping motor) 50. An optical information recording medium 1 can be rotated by the rotary motor 50.

The optical pickup 11 irradiates a reference light beam and a signal light beam on the recording medium 1 to record digital information by using the holography.

In this case, information signal to be recorded is sent to a spatial light modulator incorporated (to be described later) in the optical pickup 11 via a signal generation circuit 86 by a controller 89, and the signal light beam is modulated by the spatial light modulator.

In the case of reproducing information recorded in the recording medium 1, a phase conjugate light of the reference light beam emitted from the optical pickup 11 is generated by the phase conjugate optical system 12. Here, the phase conjugate light is a light wave that progresses in an inverse direction against an input light, while maintaining an identical wave surface (wavefront) of the inputted light. A reproduced light reproduced by the phase conjugate light is then detected by an optical detector (to be described late) incorporated in the optical pickup 11 to reproduce a signal by a signal processing circuit 85.

An irradiation time period of the reference light beam and signal light beam to be irradiated on the recording medium 1 can be adjusted by the controller 89 that controls an open-close time period of a shutter (to be described later) in the optical pickup 11 via a shutter control circuit 87.

The disc cure optical system 13 generates a light beam to be used for a pre-cure process and a post-cure process of the recording medium 1. Here, the pre-cure process means a preceding process that irradiates a predetermined light beam on a desired position in advance before irradiating the reference light beam and signal light beam on the recording medium 1, when information is recorded in the desired position on the recording medium 1. The post-cure process means a post process that irradiates a predetermined light beam on a desired position to turn the desired position into a write inhibition, after information is recorded in the desired position on the recording medium 1.

The disc rotation angle detection-use optical system 14 is used for detecting a rotation angle of the recording medium 1. In the case of adjusting the recording medium 1 to a predetermined rotation angle, a signal in response to the rotation angle is detected by the disc rotation angle detection-use optical system 14 to control the rotation angle of the recording medium 1 by the controller 89 via a rotary motor control circuit 88, by using the detected signal.

A light source drive circuit 82 supplies a light source drive current to each of the light sources of the optical pickup 11, disc cure optical system 13, and disc rotation angle detection-use optical system 14 to allow an light beam of a predetermined light quantity to be emitted from the respective light sources.

Further, each of the optical pickup 11, phase conjugate optical system 12, and disc cure optical system 13 provides a mechanism capable of sliding in a radial direction of the recording medium 1 to their positions, therefore, a position control can be executed for each by an access control circuit 81.

In the meantime, the recording technique using the holography is a technique capable of recording ultrahigh density information, therefore, there is a tendency for an allowable error to become extremely low for an inclination and a displacement of the recording medium 1, for example. For this reason, a mechanism is provided in the optical pickup 11 to detect a displacement amount caused by a relatively small allowable error, such as an inclination, displacement, etc., of the recording medium 1. A servo signal generation circuit 83 then generates a signal to be used for a servo control. A servo mechanism may be provided in the optical information recording and reproducing apparatus 10 to correct the displacement amount through a servo control circuit 84.

Further, the optical pickup 11, phase conjugate optical system 12, disc cure optical system 13, and disc rotation angle detection-use optical system 14 may be combined together in several optical system units or in one unit.

Figure 2:
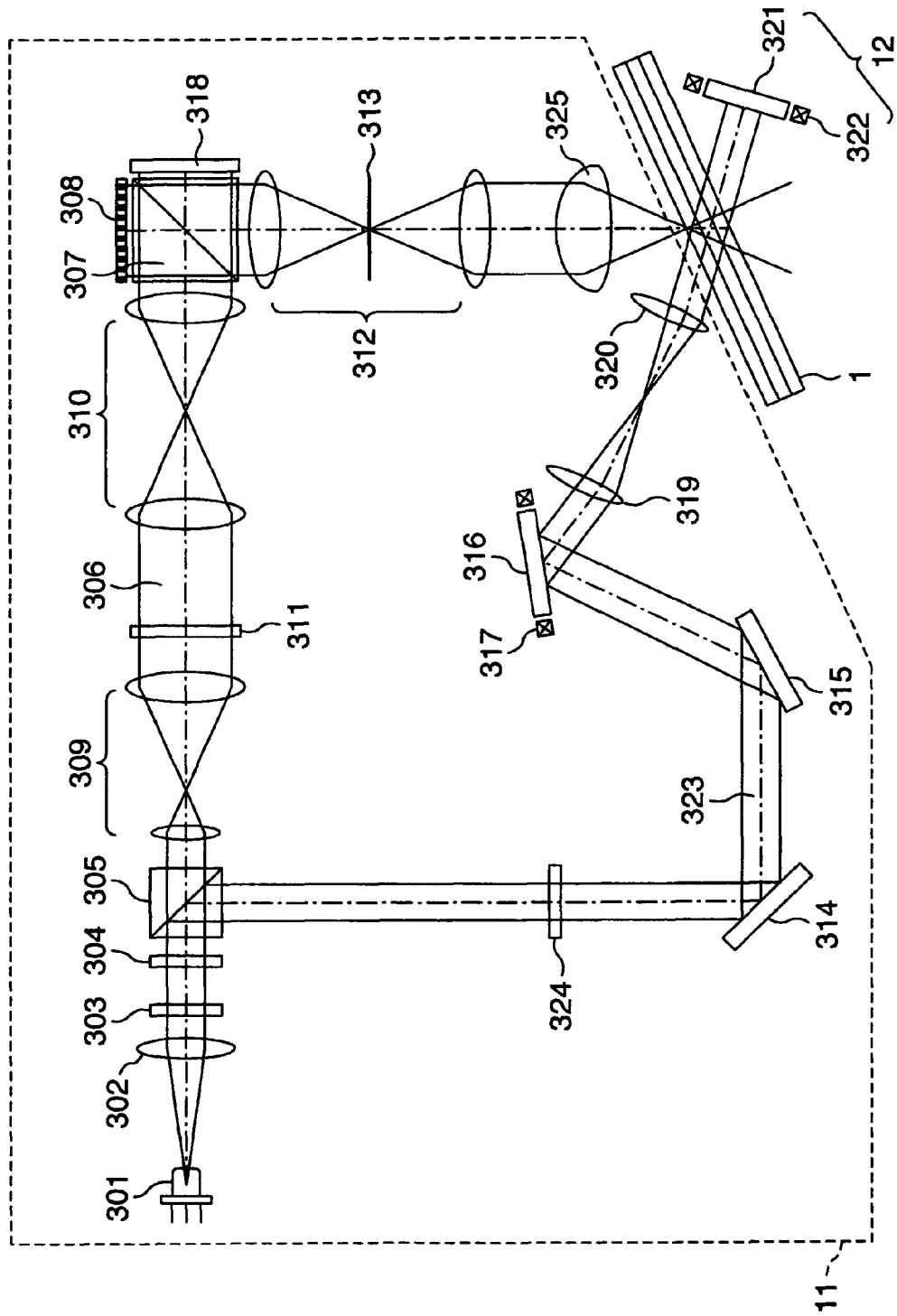
FIG. 2 is a schematic diagram showing a pickup incorporated in the optical information recording and reproducing apparatus.

FIG. 2 shows a constitution example (general angle multiplexing scheme) of an optical system of the optical pickup 11 in the optical information recording and reproducing apparatus 10.

The light beam emitted from a light source 301 transmits a collimate lens 302 to then enter a shutter 303. When the shutter 303 is opened, the light beam transmits through the shutter 303 and then enters a PBS (Polarization Beam Splitter) prism 305, after a polarization direction of the light beam is controlled such that a light quantity ratio of a P-polarization and S-polarization is set to a desired ratio by an optical device 304 constituted by a half-wavelength plate, for example.

The light beam transmitted through the PBS prism 305 is expanded in an light beam diameter by a beam expander 309 and thereafter enters a spatial light modulator 308 via a phase mask 311, a relay lens 310, and a PBS prism 307.

A signal light beam 306 added with information by the spatial light modulator 308 transmits through the PBS prism 307 to propagate through a relay lens 312 and a space filter 313. Thereafter, the signal light beam 306 is converged onto the recording medium 1 by an object lens 325.

On the other hand, the light beam reflected by the PBS prism 305 acts as a reference light beam 323 to be set in a predetermined polarization direction by a polarization direction conversion device 324 depending on the time of recording and reproducing to then enter a galvanometer mirror 316 via a mirror 314 and a mirror 315. An incident angle of the reference light beam 323 to be irradiated onto the recording medium 1, after passing through a lens 319 and a lens 320, can be set to a desired angle since the galvanometer mirror 316 can be adjusted by an actuator 317 in angle.

In this way, by irradiating the signal light beam 306 and reference light beam 323 on the recording medium 1 such that they are superposed with each other, an interference fringe pattern is formed inside the recording medium 1 and by writing this pattern in the recording medium 1, information is recorded. Further, it is possible to record information in an angle multiplexing recording since the incident angle of reference light beam 323 irradiated onto the recording medium 1 can be varied by the galvanometer mirror 316.

When reproducing the recorded information, the reference light beam 323 is irradiated onto the recording medium 1, and the light beam transmitted through the recording medium 1 is reflected by the galvanometer mirror 316 to thereby generate a phase conjugate beam, as described above.

A reproduced light beam reproduced by the phase conjugate light propagates through the object lens 325, relay lens 312, and space filter 313. Thereafter, the reproduced light beam is reflected by the PBS prism 307 to enter an optical detector 318 and to thereby reproduce the recorded signal.

In addition, the constitution of optical system in the optical pickup 11 is not limited to the constitution in FIG. 2. For example, a constitution shown in FIG. 3 may be acceptable.

Figure 3:
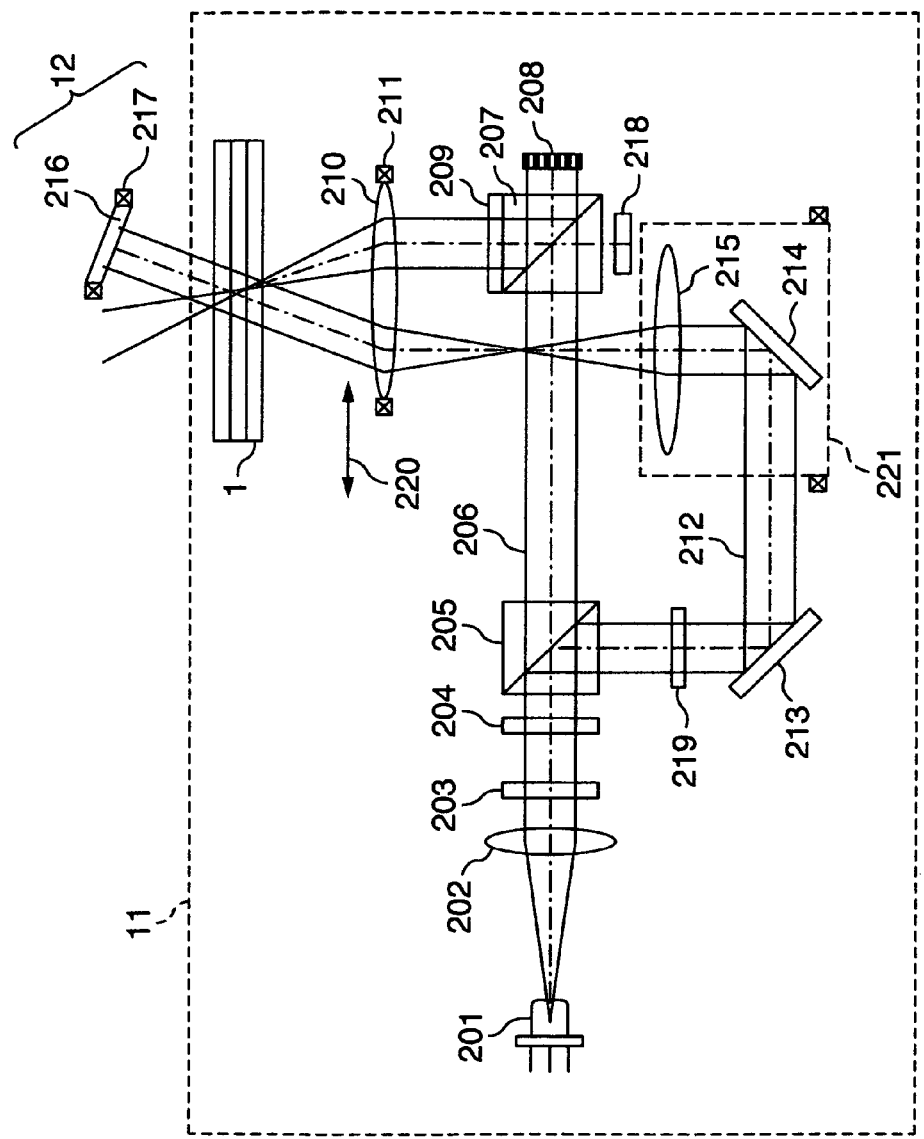
FIG. 3 is a schematic diagram showing another pickup incorporated in the optical information recording and reproducing apparatus.

The following description will be concerned with FIG. 3.

The light beam emitted from a light source 201 transmits through a collimate lens 202 to then enter a shutter 203. When the shutter 203 is opened, the light beam transmits through the shutter 203 and, thereafter, enters a PBS prism 205, after a polarization direction of the light beam is controlled such that a light quantity ratio of a P-polarization and S-polarization is set to a desired ratio by an optical device 204 constituted by a half-wavelength plate, for example.

A light beam transmitted through the PBS prism 205 enters a spatial light modulator 208 via a PBS prism 207.

A signal beam 206 added with information by the spatial light modulator 208 is reflected by the PBS prism 207 to propagate an angle filter 209 which is a filter which is allows only a light beam having a predetermined incident angle to pass therethrough. Thereafter, the signal light beam is converged onto the recording medium 1 by an object lens 210.

On the other hand, the light beam reflected by the PBS prism 205 acts as a reference light beam 212 to be set in a predetermined polarization direction by a polarization direction conversion device 219 in response to whether recording or reproducing is being performed. Thereafter, the reference light beam 212 enters a lens 215 via a mirror 213 and a mirror 214.

The lens 215 converges the reference light beam 212 onto a back-focus surface of the object lens 210, and the reference light beam once converged on the back-focus surface of the object lens 210 is turned again into a parallel light beam by the object lens 210 to then irradiate on the recording medium 1.

Here, the object lens 210 or an optical block 221 can be driven in a direction indicated by an arrow 220. The position of the object lens 210 or optical block 221 is shifted in the arrow direction or a drive direction to vary a relative position relation between the object lens 210 and a converging point on the back-focus plane of the object lens 210, so that the incident angle of reference light beam 212 to be irradiated on the recording medium 1 can be set to a desired angle.

In this way, the signal beam 206 and reference light beam 212 are irradiated on the recording medium 1, such that they are superposed with each other, to form the interference fringe pattern inside the recording medium 1 and write this pattern in the recording medium 1, thereby recording information. Further, the position of object lens 210 or optical block 221 is shifted in the drive direction 220 so as to be able to vary the incident angle of reference light beam 212 to be irradiated on the recording medium 1, so that it is possible to record information by the angle multiplexing recording.

When reproducing the recorded information, as described above, the reference light beam 212 is irradiated on the recording medium 1, and the light beam transmitted through the recording medium 1 is reflected by a galvanometer mirror 216 to thereby generate the phase conjugate beam.

A reproduced light beam by the phase conjugate light propagates through the object lens 210 and angle filter 209. Thereafter, the reproduced light beam transmits through the PBS prism 207 and enters an optical detector 218, thereby reproducing the recorded information.

The optical system shown in FIG. 3 has an advantage of being able to make it downsized considerably, compared with the constitution of the optical system in FIG. 2, since the signal light beam 206 and reference light beam 212 are entered into the same single object lens 210.

Figure 4A:
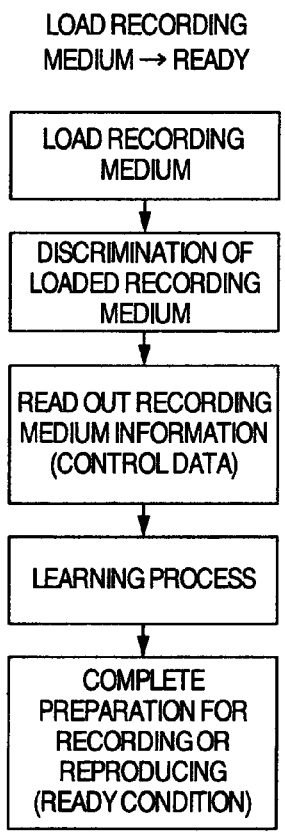
FIG. 4A is an operation flowchart of the optical information recording and reproducing apparatus.
Figure 4B:
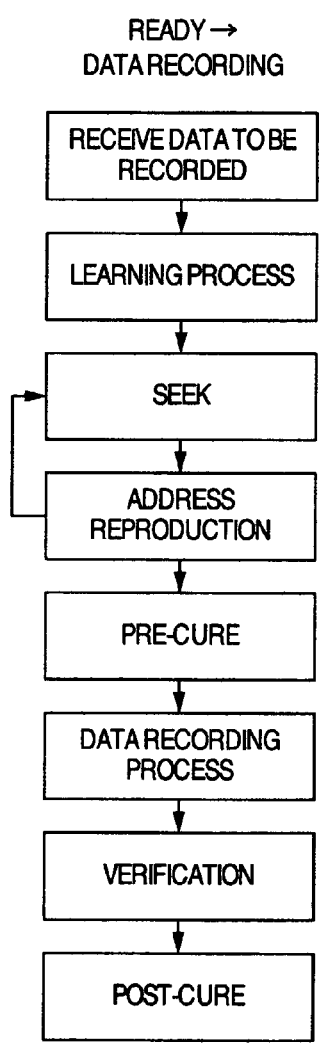
FIG. 4B is another operation flowchart of the optical information recording and reproducing apparatus.
Figure 4C:
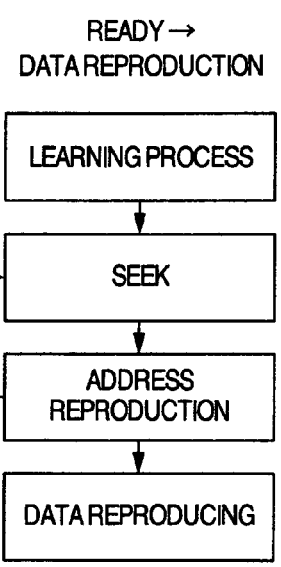
FIG. 4C is still another operation flowchart of the optical information recording and reproducing apparatus.

FIGS. 4A to 4C show operation flowcharts of the recording and reproducing by the optical information recording and reproducing apparatus 10. Particularly, the following description will be concerned with operation flowcharts for the record and reproduction by using the holography.

FIG. 4A shows an operation flowchart indicating from an operation from after the recording medium 1 is loaded into the optical information recording and reproducing apparatus 10 till a preparation for the record and reproduction is completed. FIG. 4B shows an operation flowchart indicating from a preparation completed condition till an operation that records information in the recording medium 1. FIG. 4C shows an operation flowchart indicating from the preparation completed condition till an operation that reproduces the recorded information from the recording medium 1.

Referring to FIG. 4A, the recording medium 1 is loaded in the optical information recording and reproducing apparatus 10. The apparatus 10 then discriminates whether the loaded recording medium 1 is for recording or reproducing digital information by using the holography.

From a discriminated result for the recording medium 1, if the process of apparatus 10 determines that recording medium 1 is for recording and reproducing the digital information by using the holography, the apparatus 10 reads out control data recorded in the recording medium 1 to obtain information regarding the recording medium 1 and information regarding various setting conditions for the recording and reproducing.

After reading out the control data, the process of apparatus 10 executes a learning process concerning various adjustments and the optical pickup 11 in response to the control data to complete the preparation of recording or reproducing.

Referring to FIG. 4B, the flow of operation from the preparation completed condition till information recording is such that the apparatus 10 starts from receiving data to be recorded in the recording medium 1 to send the information corresponding to the data to the spatial light modulator in the optical pickup 11.

Thereafter, the apparatus 10 executes various learning processes in advance, as required, such that high quality information can be recorded in the recording medium 1 and then arranges the optical pickup 11, and disc cure optical system 13, respectively, on predetermined positions, while repeating a seek operation and an address reproduction.

Thereafter, the apparatus 10 executes the pre-cure process on to a predetermined domain by using the light beam emitted from the disc cure optical system 13 to then record data in the recording medium 1 by using the reference light beam and signal light beam emitted from the pickup 11.

After recording the data, the data is verified as required, and the post-cure process is then executed by using the light beam emitted from the disc cure optical system 13.

Referring to FIG. 4C, the flow of operation from the preparation completed condition till reproducing the recorded information is such that the apparatus 10 executes various learning processes in advance, as required, so that high quality information can be reproduced from the recording medium 1. Thereafter, the apparatus 10 arranges the optical pickup 11 and phase conjugate optical system 12, respectively, on predetermined positions, while repeating the seek operation and the address reproduction.

Thereafter, the reference light beam is irradiated on the recording medium 1 from the optical pickup 11 to read out the recorded information.

Figure 10:
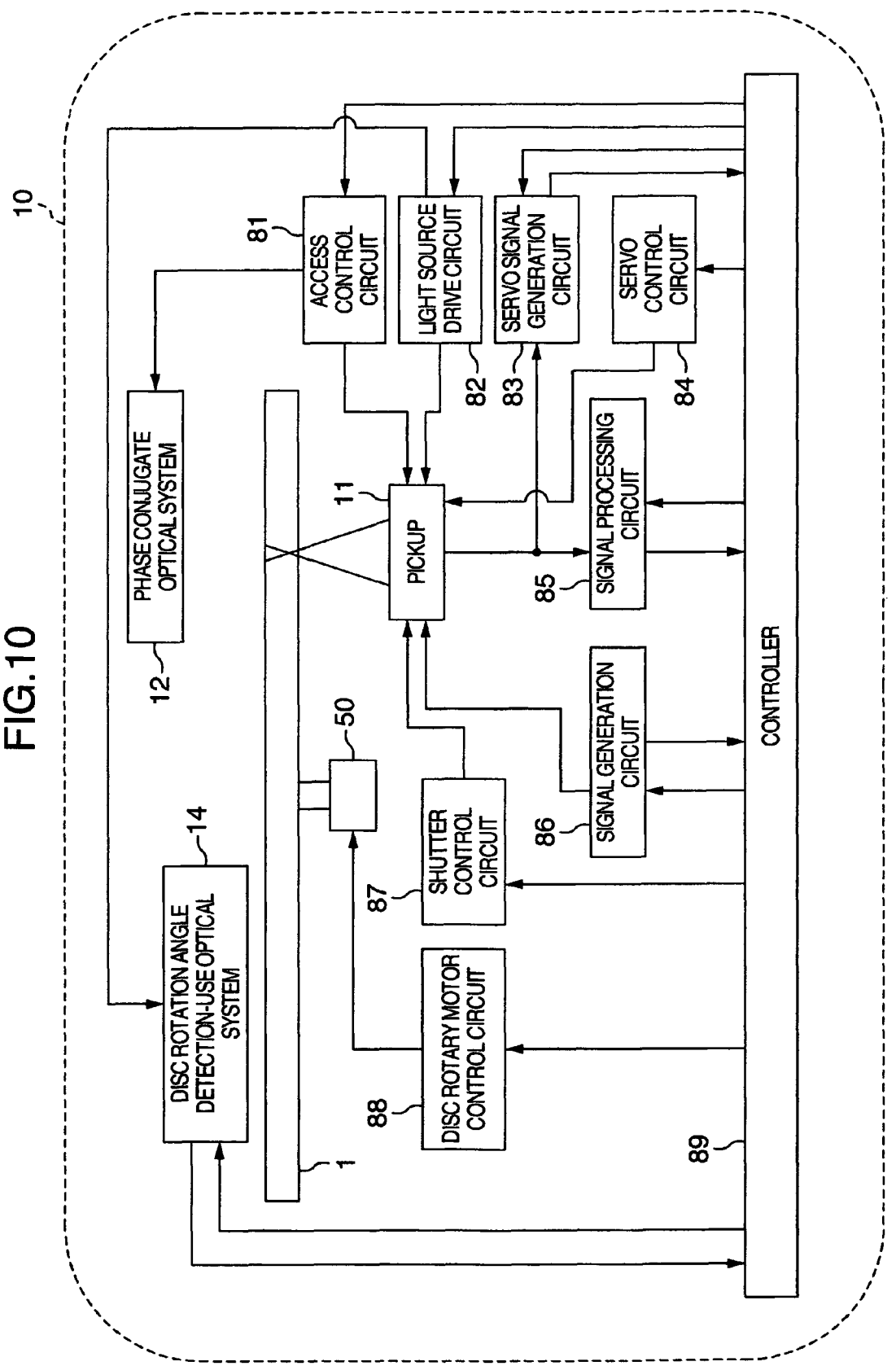
FIG. 10 is a schematic diagram showing another optical information recording and reproducing apparatus.

Now, a method of executing a recording process and the pre-cure process or the post-cure process by using a single driving device will be explained in detail in the case where the cure process is executed simultaneously during data recording when recording digital information using the holography in a constitution shown in FIG. 10 according to the invention.

Note here that the driving device used in this embodiment means a device that moves a laser irradiation unit to an arbitrary target irradiation position on the recording medium 1.

First, a data recording method will be described with use of FIG. 5 and FIGS. 6A to 6D.

Figure 5:
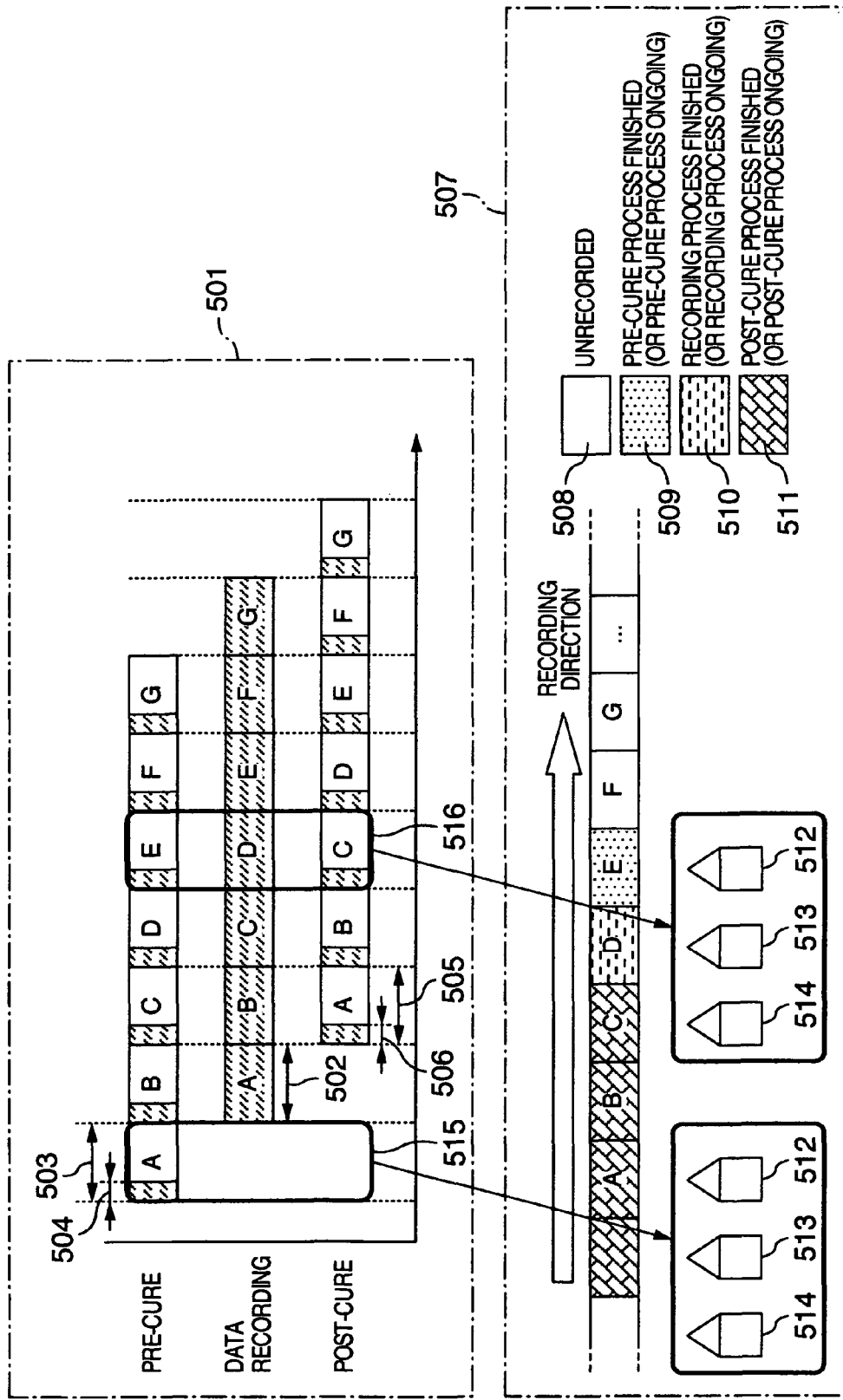
FIG. 5 is an explanatory diagram showing a laser irradiation arrangement that can realize enhancement of the transfer rate.

Referring to FIG. 5, a reference numeral 501 indicates an example of an execution time schedule for the pre-cure process, the data recording process, and the post-cure process on the abscissa as a time axis. A numeral 502 indicates a time Tw to be required for executing a multiple recording in a single position (corresponding to one block). A numeral 503 indicates a time to be allotted to the pre-cure process, which is identical to the time Tw. A numeral 504 indicates a time Tpr to be required for the practical pre-cure process. An emission process (light beam irradiation) is not executed during a time period calculated from (Tw−Tpr). A numeral 505 indicates a time to be allotted to the post-cure process, which is identical to the time Tw. A numeral 506 indicates a time Tpo to be required for the practical post-cure process. The emission process (light beam irradiation) is not executed during a time period calculated from (Tw−Tpo).

Oblique lines portion indicates a time period of the practical emission process, and each of the emission processes is executed at every time Tw in a pipeline process fashion, as shown in the execution time schedule 501.

A time period for the processes (pre-cure process+data recording process+post-cure process) from the start of recording to the end of recording for a single block of data can be shortened only to the time Tw in the case of providing a plurality of laser irradiation units, even though the time period (Tpr+Tw+Tpo) is otherwise required for the processes. a further description will be made with reference to a detailed diagram indicated by a reference numeral 507. Referring to FIG. 5, a light beam irradiation condition of portions encircled by thick lines in the execution time schedule 501 is illustrated in the detailed diagram 507, in which blocks A to G in the detailed diagram 507 correspond to the blocks A to G in the execution time schedule 501, respectively, in one to one relation. For example, the block A in the execution time schedule 501 means that the light beam is being irradiated on the block A in the detailed diagram 507. The blocks A to G disposed in the detailed diagram 507 are a successive recording range in this embodiment in which the multiple recording is executed in the respective blocks in an arrow direction. Numerals 508 to 511 indicate recording conditions of the respective blocks, in which the numeral 508 indicates an unrecorded condition where the light beam is not irradiated, the numeral 509 indicates a pre-cure process condition (start to end), the numeral 510 indicates a recording process condition (a multiple recording start to a multiple recording end), and the numeral 511 indicates a post-cure process condition (start to end). Further, a numeral 512 in the detailed diagram 507 schematically indicates an optical beam irradiation position for use in the pre-cure process, a numeral 513 schematically indicates an optical beam irradiation position for use in the data recording process, and a numeral 514 schematically indicates an optical beam irradiation position for use in the post-cure process. The three optical beam irradiation positions 512 to 514 are arranged at positions where they can simultaneously irradiate the light beams on three successive blocks adjacent to each other in order of the blocks aligned in a recording direction. At this time, either the recording medium 1 or the light beam may be moved.

A process condition indicated by a reference numeral 515 is such that the optical beam irradiation position 512 for use in the pre-cure process is irradiating on to the block A, and the remaining optical beam irradiation positions 513 and 514 are not irradiating yet. Thereafter, a condition where the pre-cure process has proceeded up to the block E in the execution time schedule 501 is indicated by a numeral 516 wherein the blocks A to B indicate that the post-cure process has been finished, the block C indicates either the post-cure process has been finished or is being executed. The block D indicates either the recording process is ended or being executed and the block E indicates either the pre-cure process has been finished or is being executed. In this way, during execution of the data recording process, the pre-cure process is executed simultaneously for a succeeding block, and the post-cure process is also executed simultaneously for a preceding block. Therefore, it is unnecessary to separately allot time periods only for the pre-cure process and post-cure process.

In this regard, at a beginning of the recording as mentioned above, a time period is required only for executing the pre-cure process, and at the end, a time period is also required only for executing the post-cure process. For example, when the recording is ended at the block G in the detailed diagram 507, the light beam is not irradiated for the pre-cure process and recording process after the block G is processed and, finally, the recording is then ended by irradiating the light beam for use in the post-cure process. However, this time period is minimal from view point of the successive recording process as a whole, therefore, the time period does not adversely affect the transfer rate.

FIG. 6A shows an example of arranging the optical beam irradiation unit in the case of integrating the pickup 11 and the disc cure optical system 13 into a single unit. The optical beam irradiation unit 513 for use in the data recording process in FIG. 5 is arranged at a position 602. A cure unit which functions both as the optical beam irradiation unit 512 for use in the pre-cure process and as the optical beam irradiation unit 514 for use in the post-cure process, is arranged at a position 603. These positions 602 and 603 are both disposed on a same driving device 601 so that they are able to move in arbitrary positions on a recording surface so that the light beam is irradiated on the holography recording surface. The cure unit positioned at the position 603 is operable to move in such a way in which its movement locus 604 becomes a circle about the center of the position 602. While this embodiment is directed to an example of a circle, the movement locus 604 is not necessarily limited to the circle and an ellipse movement as well as a linear movement may be used. Further, it is not necessarily required that the movement locus runs about the center of the position 602.

Reference numerals 605, 606 indicate spots irradiated on the holography recording surface from the positions 602, 603. A numeral 607 shows a movement locus 604 projected on to the recording surface. A numeral 608 indicates a locus of recording executed by the data recording. By arranging the cure unit at the position 603, the spot 606 irradiated on the recording surface by the light beam can be irradiated freely as long as it is on the locus 607. It is a matter of course that, if the driving device 601 is moved, the irradiation can be made on to arbitrary positions, not limited to the positions on the locus 607.

Cases 609 in FIG. 6B, 612 in FIG. 6C, and 615 in FIG. 6D, are examples of realizing the optical beam irradiation unit functioning both for the pre-cure process and for the post-cure process by using these arrangements.

The case 609 in FIG. 6B indicates that the pre-cure process is being executed while the data recording process is being executed. That is, the data recording is executed at a position 610, and the pre-cure process is executed at a position 611.

The case 612 in FIG. 6C indicates that the post-cure process is being executed while the data recording process is being executed. That is, the data recording is executed at a position 613, and the post-cure process is executed at a position 614.

In the case of switching the execution from the case 609 to the case 612, the position 603 may be moved to 180 degrees about the center of the position 602 to then perform irradiation. In this way, both the pre-cure process and the post-cure process can be executed without moving the driving device 601 even during the multiple recording at the spot 605 (i.e., without suspending the data recording). The cases 609 and 612 indicate that the irradiated spots are respectively formed at positions in the recording direction, however, it is possible to execute the pre-cure process and the post-cure process at arbitrary positions if the irradiated spot 606 on the recording surface by the light beam is present on the locus 607.

In the case 615 in FIG. 6D, the optical beam irradiation units are provided respectively for the pre-cure process and the post-cure process, and the pre-cure process and the post-cure process are executed simultaneously at arbitrary positions. In also this case, advantages similar to the above can be obtained even without making the optical beam irradiation unit function both as the pre-cure process and as the post-cure process.

In this way, a cure-use optical beam irradiation unit functioning both as the optical beam irradiation unit 512 for use in the pre-cure process and as the optical beam irradiation unit 514 for use in the post-cure process, is arranged on a single driving device and the cure-use optical beam irradiation unit is movably arranged in the driving device. With the arrangement, it becomes possible to execute the post-cure process and pre-cure process without moving the driving device during data recording.

FIG. 7 is a diagram showing an example of the execution time schedule of the pre-cure process, data recording process and post-cure process indicated on the abscissa as a time axis. Referring to FIG. 7, the cure-use optical beam irradiation unit is moved to the position of the optical beam irradiation unit 514 to execute the post-cure process after the pre-cure process is finished by the optical beam irradiation unit 512 (the order of the pre-cure process and post-cure process may be inverse), while data is being recorded by the optical beam irradiation unit 513. In this way, the pre-cure process and post-cure process are executed simultaneously for other blocks during the data recording process by using a single driving device, so that both the pre-cure process and post-cure process can be realized without moving the driving device during the multiple recording of data. In the cases 609 in FIG. 6B, 612 in FIGS. 6C and 615 in FIG. 6D, including a case shown in FIG. 7, the irradiation is not executed for the recording blocks B, D adjacent to the block C in FIG. 7, however, it dies not matter whether the irradiation is executed for the adjacent recording blocks or not.

Figure 8A:
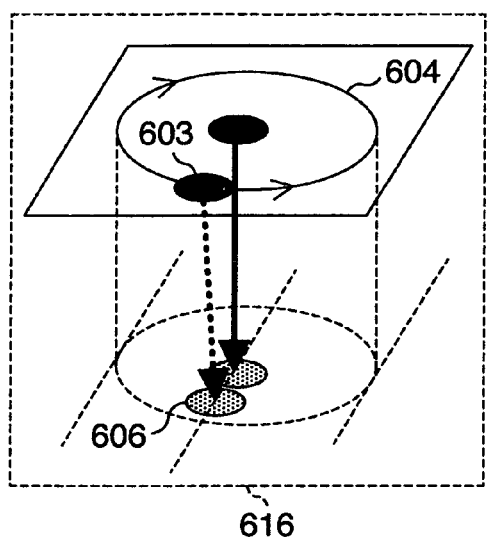
FIG. 8A is an explanatory diagram of the first embodiment that realizes a low cost as an example 3.
Figure 8B:
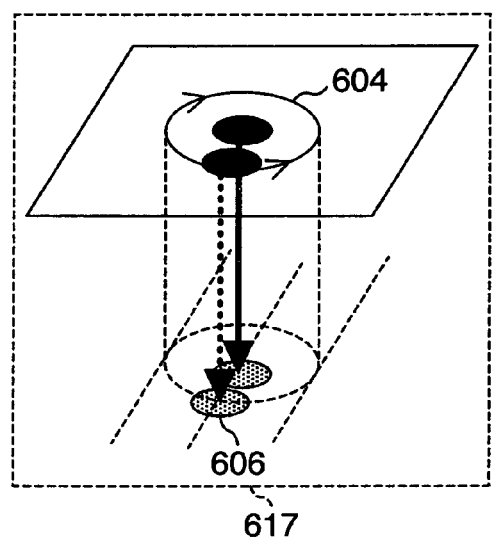
FIG. 8B is another explanatory diagram of the first embodiment that realizes a low cost as an example 3.

In the case where the pre-cure process and/or the post-cure process (hereinafter, collectively referred to as a cure process) is to be executed for adjacent recording positions, the irradiation may be executed for the recording surface in an oblique direction, not a perpendicular direction, without changing a movement radius of the position 603 such as in a case 616 in FIG. 8A, so that the cure process can be executed for the spot 606 adjacent to the spot 605. Alternatively, the movement radius of the position 603 is changed as in a case 617 shown in FIG. 8B to irradiate the light beam on the recording surface in the perpendicular direction and adjust a radius position such that the irradiation can be executed for the spot 606 adjacent to the spot 605, so that the cure process can be executed for the spot 606 adjacent to the spot 605. Note that it does not matter how many blocks the block under irradiation is away from the data recording irradiation spot.

Figure 8C:
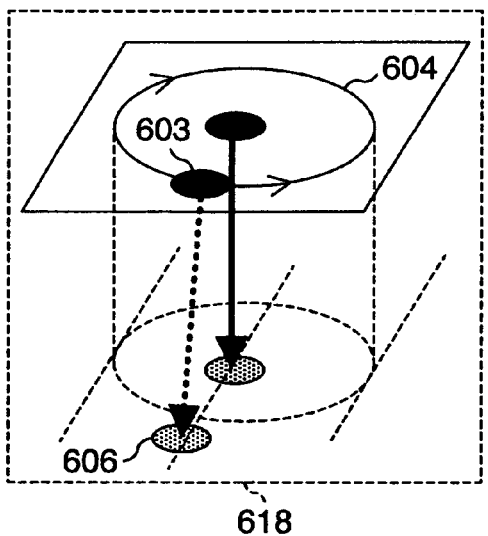
FIG. 8C is still another explanatory diagram of the first embodiment that realizes a low cost as an example 3.

Further, by applying the case 616 as in a case 618 shown in FIG. 8C, the irradiation is executed within a range in which a sufficient cure effect can be obtained outside the movement locus, so that the cure process can be executed for a peripheral domain outside of the movement locus.

[Embodiment 2]

A second embodiment will be described with reference to FIGS. 9A to 9D. The difference in constitution from the first embodiment which is typified by FIG. 6 is that the optical beam irradiation unit 512 for use in the pre-cure process is arranged at the position 603 as a fixed position on the driving device 601, and the optical beam irradiation unit 514 for use in the post-cure process is also arranged at the position 604 as a fixed position on the same driving device 601, respectively, each of which is not moved on the driving device 601.

Figure 9A:
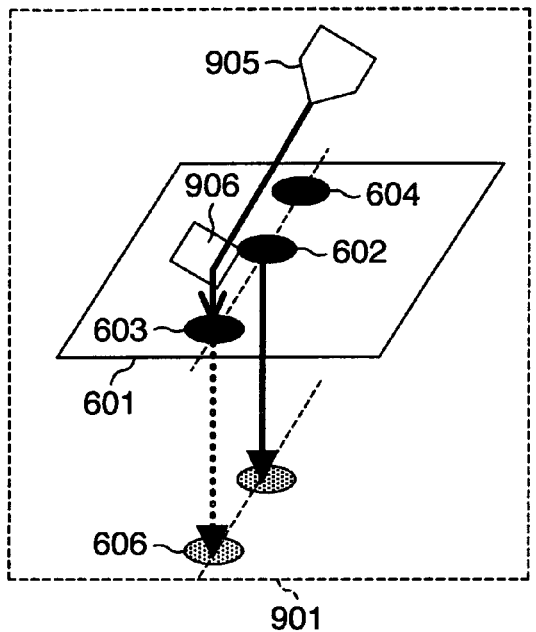
FIG. 9A is an explanatory diagram of a second embodiment that realizes a low cost.
Figure 9B:
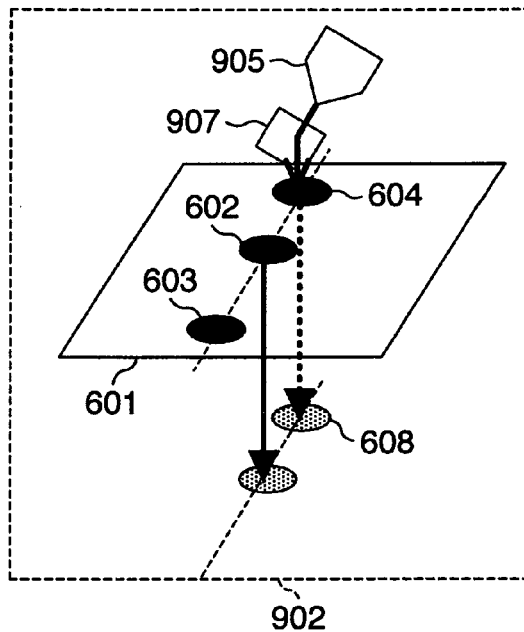
FIG. 9B is another explanatory diagram of the second embodiment that realizes a low cost.
Figure 9C:
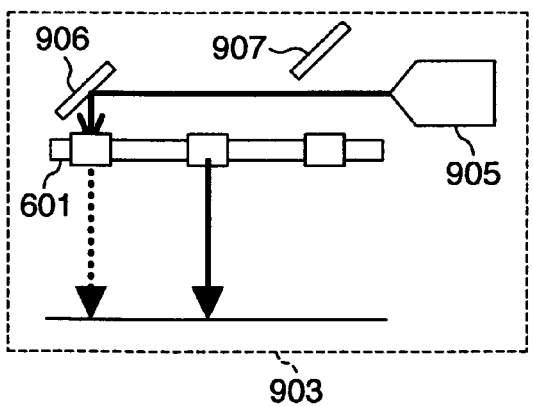
FIG. 9C is still another explanatory diagram of the second embodiment that realizes a low cost.

The following description will be concerned with cases 901 in FIGS. 9A and 903 in FIG. 9C.

A reference numeral 905 is a light source to be used for the cure process, for irradiating a laser beam on the recording medium. The laser beam transmits through an optical system (not shown) required for laser irradiation, is then reflected by a mirror 906 and irradiated on to the spot 606 on the recording medium from the position 603. A case 903 is a diagram as viewed from the side, and it is appreciated that the laser beam emitted from the light source 905 is irradiated on to the spot 606 via the mirror 906.

Figure 9D:
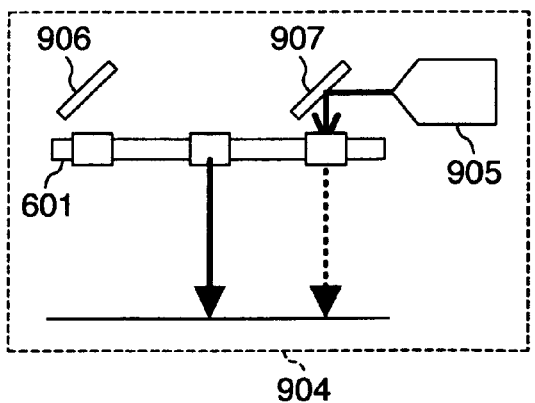
FIG. 9D is still another explanatory diagram of the second embodiment that realizes a low cost.

Next, the following description will be concerned with cases 902 in FIGS. 9B and 904 in FIG. 9D. In these cases, a mirror 907 is provided before the laser beam arrives at the mirror 906 so that the laser beam is irradiated on to 608 on the recording medium from the position 604. The case 904 is a diagram as seen from the side, and it is appreciated that the laser beam emitted from the light source 905 is irradiated on to 608 via the mirror 907.

In the case where the laser beam arrives at the mirror 906 so that it is irradiated on to the spot 606 on the recording medium from the position 603, the mirror 907 may be moved as indicated in the case 903 so that the laser beam is not blocked by the mirror 907.

In the case where the cases 901 in FIGS. 9A and 903 in FIG. 9C are applied to the irradiation for use in the pre-cure process and the cases 902 in FIGS. 9B and 904 in FIG. 9D are applied to the irradiation for use in the post-cure process, both the post-cure process and pre-cure process can be executed without moving the driving device on the driving device 601 during the data recording, thereby providing the same advantages as the first embodiment. Note that the light source 905 is used for both the pre-cure process and the post-cure process in the second embodiment, however, an individual light source may be provided for each of the processes. In addition, the mirrors 906, 907 are used for an example for realizing the irradiation on to 606 and 608. However, they are not necessarily required as long as the irradiation on to 606 and 608 is realized.

In the foregoing the embodiments have described for the optical information recording and reproducing apparatus and the method of the same. However, it should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording and reproducing apparatus that irradiates a light beam emitted from a light source on to an optical information recording medium having a recording area for recording information by using a holography, the apparatus comprising:

a recording process unit which irradiates a signal light beam and a reference light beam for recording information;

at least one of a pre-cure process unit which irradiates a predetermined light beam on a desired position on the optical information recording medium prior to irradiating the reference light beam and the signal light beam on to the desired position thereof when information is recorded in the desired position of the optical information recording medium and a post-cure process unit which irradiates a predetermined light beam on to the desired position for making the desired position non-rewritable recordable after the information is recorded in the desired position thereof; and a first driving unit which moves the recording process unit relative to the optical information recording medium, and wherein the first driving unit functions also as a driving unit for moving the at least one of the pre-cure process unit and the post-cure process unit relative to the optical information recording medium, wherein a second driving unit is provided for driving the at least one of the pre-cure process unit and the post-cure process unit independently from moving of the at least one of the pre-cure process unit and the post-cure process unit performed by the first driving unit, and wherein the second driving unit moves in at least a portion of a circumference generally about a center of a lens in the recording process unit.

2. An optical information recording method for recording information by using a holography by irradiating a light beam emitted from a light source on an optical information recording medium having a recording area, the method comprising:

irradiating a signal light beam and a reference light beam for recording information on to a predetermined position on the optical information recording medium;

performing at least one of a pre-cure process of using a pre-cure process unit to irradiate a predetermined light beam on to the predetermined position on the optical information recording medium prior to irradiating the reference light beam and the signal light beam on to the predetermined position and a post-cure process of using a post-cure process unit to irradiate a predetermined light beam for making the desired position non-recordable after information is recorded in the desired position, wherein the pre-cure process comprises using a first driving unit to move the pre-cure process unit relative to the optical information recording medium and using a second driving unit to drive the pre-cure process unit independently from the first driving unit moving the pre-cure process unit, wherein the post-cure process comprises using the first driving unit to move the post-cure process unit relative to the optical information recording medium and using the second driving unit to drive the post-cure process unit independently from the first driving unit moving the post-cure process unit, and wherein the second driving unit moves in at least a portion of a circumference generally about a center of a lens used for irradiating a signal light beam and a reference light beam for recording information.

* * * * *